United States Patent [19]

Sedy

[11] Patent Number: 5,558,342
[45] Date of Patent: Sep. 24, 1996

[54] MECHANICAL SEAL WITH SPRING DRIVE

[75] Inventor: Josef Sedy, Mount Prospect, Ill.

[73] Assignee: Durametallic Corporation, Kalamazoo, Mich.

[21] Appl. No.: 286,665

[22] Filed: Aug. 5, 1994

[51] Int. Cl.$^6$ .................................................. F16J 15/34
[52] U.S. Cl. ........................................ 277/81 R; 277/136
[58] Field of Search ................................. 277/38, 81 R, 277/96.1, 136, 137; 464/65, 82

[56] References Cited

U.S. PATENT DOCUMENTS

| | | | |
|---|---|---|---|
| 1,444,439 | 2/1923 | Wilkinson | 464/65 |
| 2,958,213 | 11/1960 | Donner | 464/65 |
| 3,478,610 | 11/1969 | Sakai | 464/65 |
| 3,499,653 | 3/1970 | Gardner . | |
| 4,212,475 | 7/1980 | Sedy . | |
| 4,586,719 | 5/1986 | Marsi et al. . | |
| 5,039,113 | 8/1991 | Gardner | 277/81 R |
| 5,076,589 | 12/1991 | Marsi . | |
| 5,199,172 | 4/1993 | Runowski . | |
| 5,388,843 | 2/1995 | Sedy | 277/136 |

FOREIGN PATENT DOCUMENTS 1290551  9/1972  United Kingdom ............. 464/65

OTHER PUBLICATIONS

One sheet of drawings from applicant's copending Serial No. 08/202 689 filed on Feb. 25, 1994.
Three sheets of drawings from applicant's copending Serial No. 08/115 153 filed on Sep. 1, 1993.

Primary Examiner—William A. Cuchlinski, Jr.
Assistant Examiner—Scott W. Cummings
Attorney, Agent, or Firm—Flynn, Thiel, Boutell & Tanis P.C.

[57] ABSTRACT

A mechanical seal assembly for creating a sealing relationship between a housing and a shaft which is rotatable relative thereto. The seal assembly includes first and second seal rings having axially adjacent and opposed flat seal faces for creating an annular sealing region therebetween. A driving member is nonrotatably secured to the shaft and positioned in close proximity to the second seal ring, and a plurality of resilient drive connectors cooperate between the drive member and the second seal ring in angularly spaced relation therearound for effecting synchronous driving rotation of the second seal ring in response to rotation of the shaft. The resilient drive connector includes first and second concave walls formed respectively on the drive member and the second seal ring, and a coil spring disposed within and at least partially confined by each of the first and second concave walls so that each of the concave walls engages at least several coils of the coil spring for transmitting rotatable driving force from the drive member through the coil spring to the second seal ring.

20 Claims, 5 Drawing Sheets

MECHANICAL SEAL WITH SPRING DRIVE

FIELD OF THE INVENTION

This invention relates to a fluid face seal assembly, commonly referred to as a mechanical seal, and to an improved resilient pinless drive associated with one of the seal face rings.

BACKGROUND OF THE INVENTION

Mechanical seal assemblies are extensively utilized in equipment to create a sealed relationship between a housing and a shaft which is rotatable relative thereto. The mechanical seal assembly typically includes a pair of annular seal rings which are respectively sealingly and nonrotatably coupled to the shaft and housing, and which have opposed flat seal faces which are normally urged toward one another to create a substantially sealed relationship between a high pressure zone disposed adjacent one radial edge of the seal faces, and a low or atmospheric pressure zone disposed adjacent the other radial edge thereof. It is conventional in numerous applications to form the assembly as a dry gas seal in that one of the seal faces is provided with a series of grooves therein for communication with the high pressure zone. These grooves facilitate creation of a gas film between the seal faces to minimize wear thereof and to likewise minimize overall frictional drag, such as during equipment start-up. Seal assemblies of this general type are well known, and examples thereof are disclosed in U.S. Pat. Nos. 3,499, 653 and 4,212,475.

In mechanical seals and specifically dry gas seals of the general type described above, at least one of the face rings is traditionally constructed of a hard but brittle material, frequently a carbide material such as silicon carbide. This brittle seal ring, which often is the rotating seal ring, must be interconnected to the shaft so as to be driven therewith. For this purpose the seal ring is traditionally mounted on a shaft sleeve arrangement which surrounds and nonrotatably couples to the shaft. It has been conventional to utilize drive pins which are fixed to the sleeve arrangement and engage openings or recesses in the face ring for effecting a nonrotatable connection therebetween. The use of drive pins for connection to the brittle seal ring, however, has proven to be a long-standing problem. Even though traditionally several such drive pins are coupled to the ring in circumferentially-spaced relationship therearound, nevertheless the rigidity of the drive pins and seal ring, when coupled with overall manufacturing tolerances, normally results in substantially all of the drive torque being transmitted from a single drive pin to the brittle seal ring, thereby resulting in a large concentration of stress where the loaded drive pin contacts the seal ring. This concentration of stress, coupled with impacts caused by clearances during starting and stopping conditions, often cause excessive stress on the seal ring which tend to cause cracking or breaking of the brittle seal ring. In fact, breaking of the brittle seal ring has been a long-standing problem, which problem has been difficult to solve inasmuch as the brittle material of the seal ring makes manufacture of the seal ring difficult.

Prior attempts to minimize the above problem have involved design variations which are known throughout the industry as "pinless" drives. Such pinless drives have, in one variation illustrated by U.S. Pat. No. 5,199, 172, involved forming substantially semi-cylindrical protrusions integral with an outer drive sleeve, with the protrusions being of a generally rounded configuration and cooperating with a similar rounded peripheral groove formed in the brittle seal ring. This prior attempted solution, however, is one which involves complex configurations for both the drive lug and the seal ring groove, and which still necessarily results in a hard or rigid drive lug engaged directly with the brittle seal ring.

Another attempt to resolve the above problem by means of a so-called "pinless" drive is illustrated by U.S. Pat. Nos. 4,586,719 and 5,076,589. The mechanical seal disclosed in these latter patents positions the rotating seal ring within a surrounding cuplike drive ring, the latter being coupled to the shaft for rotation therewith. To nonrotatably connect the seal ring to the drive ring, the seal ring is provided with flats spaced circumferentially around the outer periphery thereof, and wedgelike elastomeric keys are positioned on the flats for confinement in notches formed in the drive ring. This overall arrangement, however, involves not only a significant number of parts due to the number of elastomeric keys, but also requires creation of both flats on the seal ring and a plurality of circumferentially-spaced undercut grooves formed in the drive ring, with the overall arrangement being of complex and costly construction and assembly.

Another problem experienced with mechanical seals and particularly dry gas seals of the type described above relates to the maintaining of the rotating seal ring in concentric relationship relative to the shaft and its support sleeve. Many of the prior seals have possessed no capability for doing so, and have relied solely on the geometric confining relationship of the various cooperating parts. Others, such as the arrangement of U.S. Pat. No. 4,586,719 described above, have provided at least some resiliency which may be at least partially effective for centering the seal ring, although in most instance such centering effect itself is often restricted by other structural relationships of the seal.

Accordingly, it is an object of this invention to provide an improved mechanical seal, and particularly a dry gas seal, which incorporates therein an improved pinless drive for cooperation with one of the seal rings, preferably the rotating seal ring, so that the seal ring when constructed of a brittle material can be successfully keyed to or driven from a support member without creating the usual high stress or impact, whereby the life of the brittle seal ring can be greatly enhanced.

It is a further object of the invention to provide an improved mechanical seal, as aforesaid, with an improved resilient centering arrangement which cooperates with but is independent of the pinless drive so as to facilitate resilient centering of the brittle seal ring relative to its driving shaft or sleeve.

According to the present invention, in a preferred embodiment thereof, there is provided an improved mechanical seal having a pair of opposed seal rings, one nonrotatably connected to the housing, the other nonrotatably connected relative to a rotating shaft. The seal rings are resiliently relatively urged toward one another so that opposed flat faces thereon are normally maintained closely adjacent one another, with one of the faces in the preferred embodiment having a groove pattern which allows pressurized gas to be fed into and between the opposed seal faces to create a thin seal film or gap between the opposed seal faces. One of the seal rings, normally the rotating seal ring, is constructed of a brittle material such as a carbide material, and is positioned within and nonrotatably coupled to a sleeve arrangement which surrounds and is drivingly coupled to the shaft. The sleeve arrangement has an annular retaining flange which exteriorly surrounds the rotating seal ring, and a plurality of resilient pinless drives are disposed circumferentially therearound for drivingly coupling the retaining flange to the seal ring. Each resilient pinless drive employs a cylindrical coil spring which is confined within and between opposed grooves formed in the retaining flange and the seal ring for creating a resilient drive coupling therebetween.

In the improved mechanical seal, as aforesaid, the retaining flange also preferably provides resilient centering strips which are confined within grooves which extend circumferentially between the adjacent pinless resilient drives, with these resilient strips creating a resilient engagement with an outer annular surface of the seal ring over a majority of the exterior annular extent thereof, whereby the resilient strips effectively support and center the seal ring.

Other objects and purposes of the invention will be apparent to persons familiar with seal assemblies of this general type upon reading the following specification and inspecting the accompanying drawings.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 1:
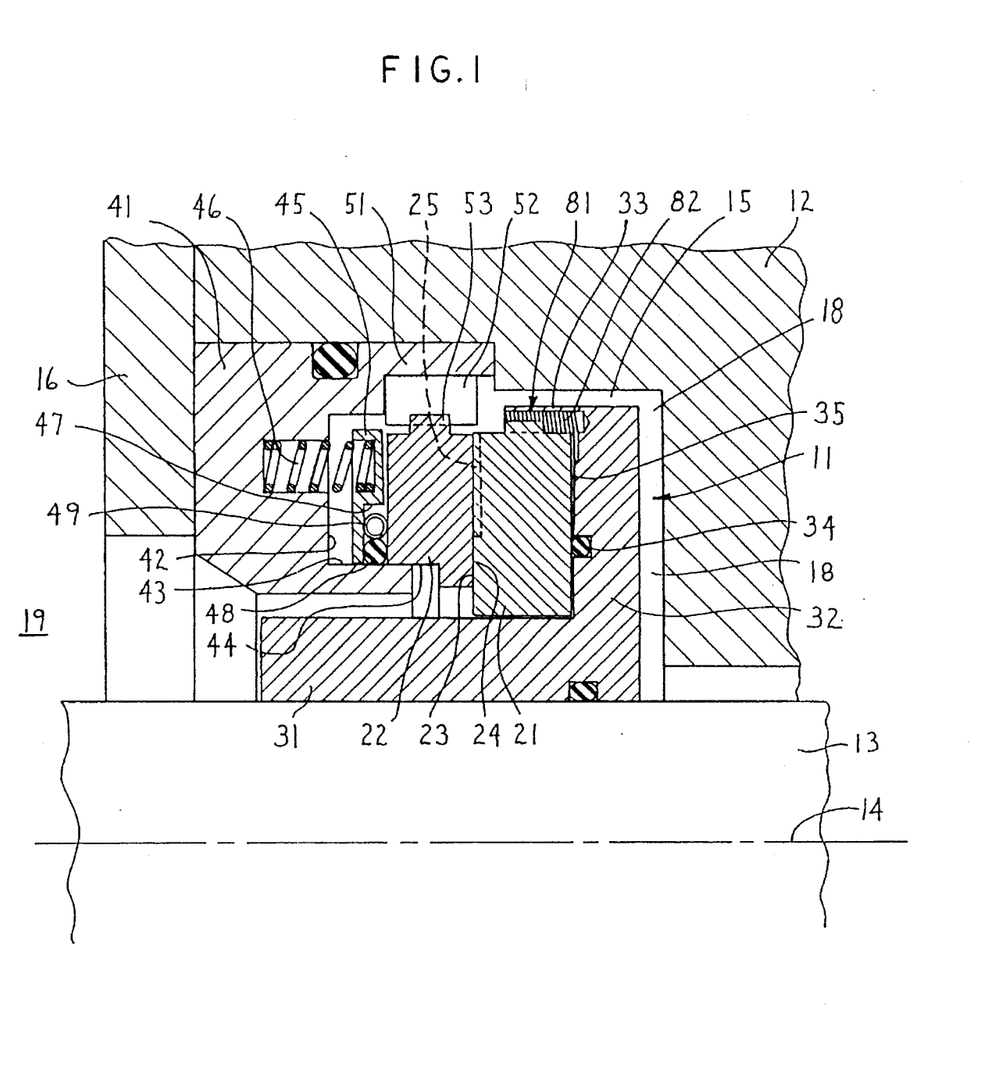
FIG. 1 is a fragmentary axial sectional view illustrating a mechanical seal according to the present invention, and its cooperation between a housing and a relatively rotatable shaft.
Figure 2:
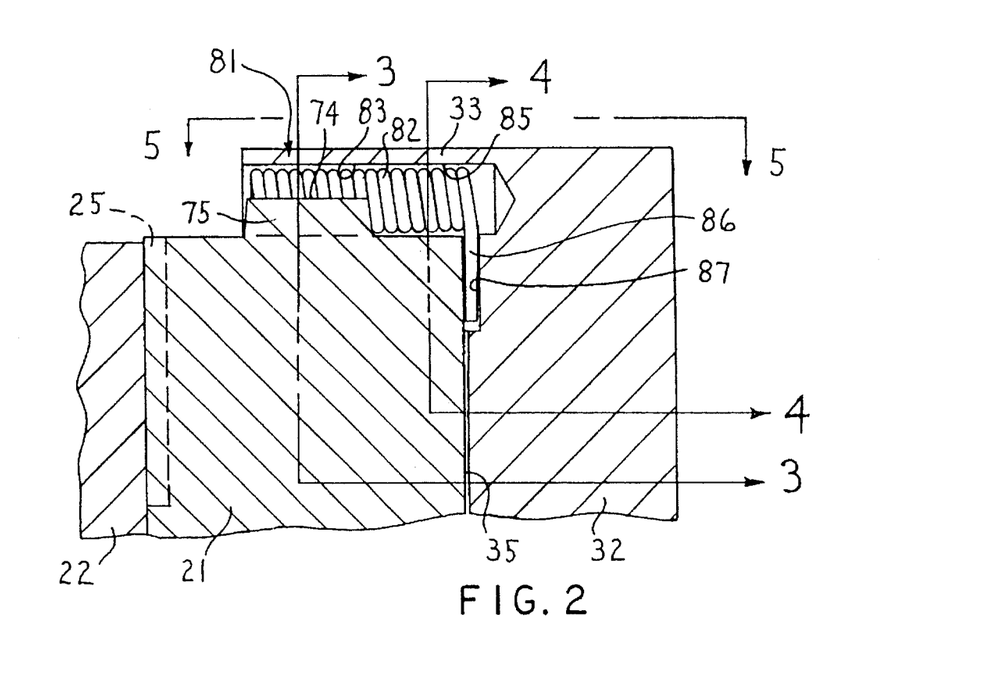
FIG. 2 is an enlarged fragmentary sectional view showing the resilient pinless drive according to the present invention.

FIG. 1 illustrates therein a mechanical seal assembly 11 disposed for cooperation between a housing 12 and a shaft 13 which is supported for rotation on the housing about its axis 14. The seal assembly 11 is disposed in surrounding relationship to the shaft 13 within a chamber 15 defined within the housing, with the seal assembly being retained within the chamber by an end plate or gland member 16 which is fixedly secured to the housing by conventional fasteners (not shown). The seal assembly 11 cooperates to create a seal between a high pressure region or space 18 and a low or atmospheric pressure space 19, the latter being the surrounding environment in the illustrated embodiment.

Seal assembly 11 includes opposed seal rings 21 and 22 which have generally flat annular seal faces 23 and 24 respectively formed thereon, the latter being disposed in closely adjacent and opposed relationship. The seal faces 23 and 24 are disposed generally within radially extending planes, and one of these seal faces has a pattern of grooves 25 formed therein, which grooves communicate with the radially outer edge of the annular contact zone between the seal faces so as to communicate with the high pressure space 18. These grooves 25, however, do not project radially through the entire contact zone between the seal faces 23 and 24, but rather terminate in spaced relation from the inner radial edge of the seal zone so as to define an annular dam region which provides greater restriction of flow, and restriction of leakage, of fluid therepast into the low pressure space 19. The grooves 25 are effective for permitting the fluid, normally a gas, to be moved into and hence create a small gap between the opposed seal faces 23 and 24 to thus minimize direct contact between these seal faces to significantly minimize seal face wear and overall frictional drag. The overall purpose of these grooves 25 is well known, and the grooves may adopt many different configurations and patterns, one example of which is illustrated by U.S. Pat. No. 4,212,475. A preferred pattern and arrangement for the grooves is disclosed in my copending U.S. application Ser. No. 08/115,153. The mechanical seal 11 of this invention, in a preferred embodiment, functions as a dry gas seal.

The seal ring 21 is mounted on and rotatably coupled to a shaft support sleeve 31, the latter being nonrotatably coupled to the shaft 13, so that the seal ring 21 rotates synchronously therewith. The shaft support sleeve 31 includes a radially projecting backing flange 32 which projects radially outwardly adjacent the backside of the seal ring 21, which backing flange 32 connects at its radially outer edge to an annular retaining flange 33 which projects axially so as to exteriorly surround at least a portion of the exterior peripheral surface of the seal ring 21. The backing flange 32 and the cooperating annular retaining flange 33 define a generally cup-shaped arrangement for support and confinement of the seal ring 21. An annular elastomeric O-ring 34 is confined within a groove formed in the backing flange 32 and resiliently and sealingly cooperates with the back face 35 of the seal ring 21. The seal ring 21 is also nonrotatably coupled to the shaft support sleeve 31 by a resilient pinless drive connection as explained hereinafter.

The rotating seal ring 21 is preferably constructed of a hard and brittle material, typically a carbide material such as silicon carbide or tungsten carbide.

With respect to the other seal ring 22, it is mounted on a housing ring 41 which is disposed within the chamber 15 and is fixedly captivated between the housing 12 and the gland 16. This housing ring 41 includes therein an annular axially-extending recess 42 defined by an inner annular wall 43. This recess receives therein at least the axially rearward part of the seal ring 22, the latter having an inner annular surface 44 which is disposed for axial slidable support on the inner annular wall 43. A spring retainer ring or disk 45 is positioned within the recess 42 directly adjacent the rear face of the seal ring 22 and is also axially movable along the inner annular wall 43. A plurality of springs, one of which is shown at 46, are disposed in circumferentially-spaced relationship, and axially cooperate between the housing ring 41 and the retainer ring 45 for urging the latter toward the rear face of the seal ring 22, which seal ring 22 is in turn resiliently urged axially toward the seal ring 21.

The retainer ring 45 has an annular recess 47 therein in which an annular elastomeric seal ring 48, such an O-ring, is confined. This seal ring 48 is disposed to create a resilient elastomeric sealing contact with both the rear face of the seal ring 22, and the annular wall 43. In the illustrated embodiment, an elongate and substantially endless coiled tension spring 49 (often referred to as a garter spring) is disposed in the recess 47 in surrounding and contacting relationship with the seal ring 48 so as to resiliently maintain the seal ring 48 in contact with the annular wall 43. It will be appreciated, however, that numerous other variations of this secondary seal can be utilized if desired.

The recess 47 in the disk 45 is normally shallower than the thickness of the O-ring 48, so that normally there is a slight separation between the side of the disk 45 facing the sealing ring 22 and the back side of the sealing ring, and pressure of coil springs 46 transfers to the sealing ring 22 entirely through the O-ring 48. Pressure by coil springs 46 is then responsible for contact by O-ring 48 with the rear face of seal ring 22 and would be doing it even if tension spring 49 was absent.

The housing ring 41 includes an annular flange 51 which projects axially inwardly therefrom in exterior surrounding relationship to the seal ring 22. This flange 51 has one or more keys or pins 52 nonrotatably secured thereto, which key 52 in turn is engaged within an axial groove formed in an annular flange part 53 which is integrally formed on and projects radially outwardly in surrounding relationship to the seal ring 22. This key 52 nonrotatably secures the seal ring 22 to the housing ring 41, but at the same time allows the seal ring 22 to slide axially along the key 52 in response to the resilient bias created by the spring 46.

Figure 5:
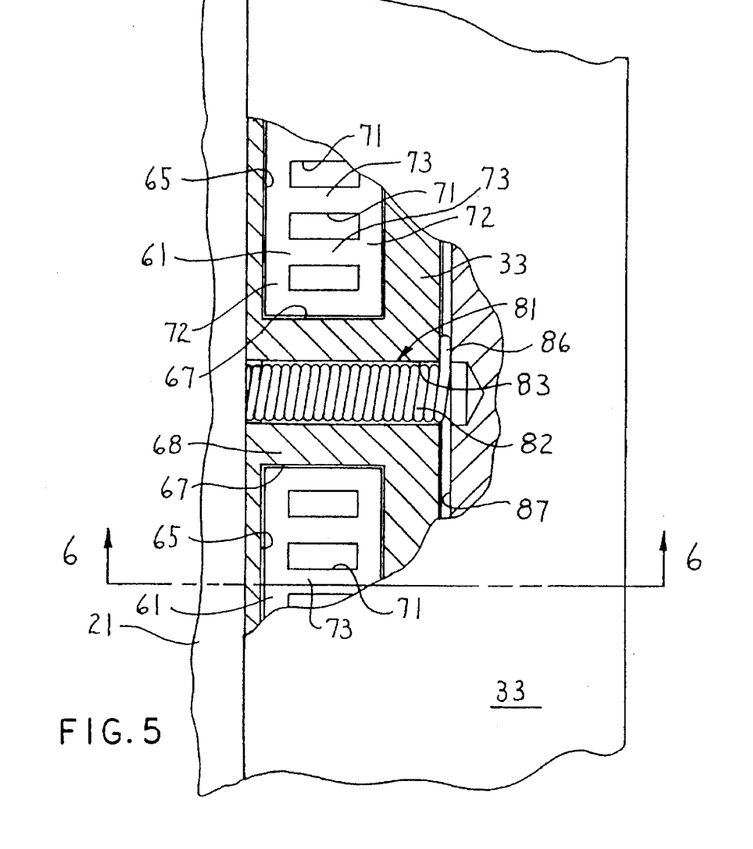
FIG. 5 is a fragmentary view taken generally along line 5—5 in FIG. 2.
Figure 6:
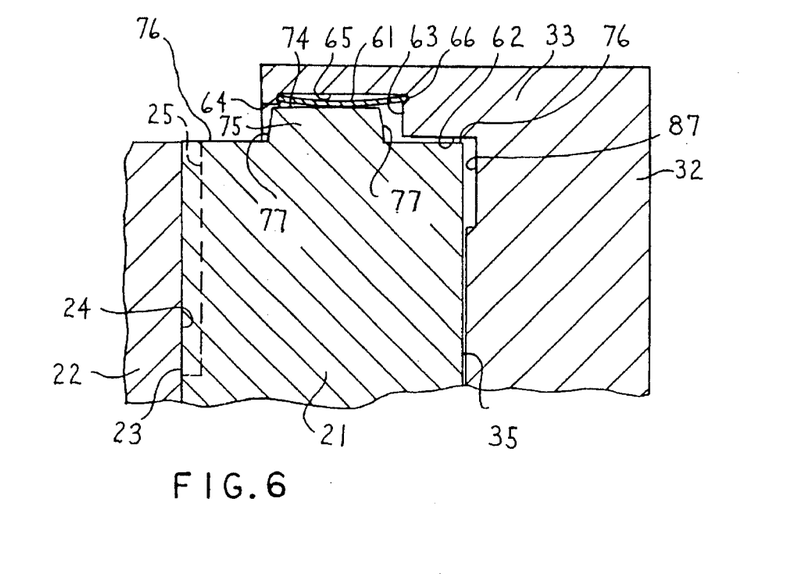
FIG. 6 is a fragmentary sectional view taken generally along line 6—6 in FIG. 5.
Figure 7:
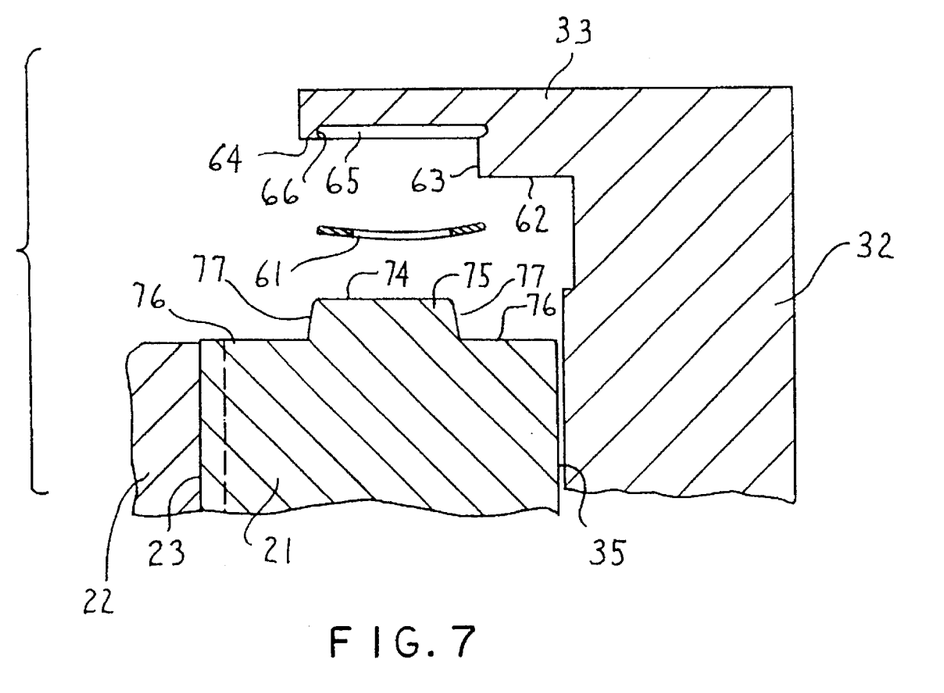
FIG. 7 is a fragmentary sectional view, in exploded form, showing the resilient centering strips and their cooperating between the retaining flange and the face ring.

To provide for resilient centering of the rotating seal ring 21 relative to the shaft support sleeve 31, a plurality of elongate resilient centering strips 61 (FIGS. 5 and 6) are mounted on the annular retaining flange 33 and resiliently cooperate with the seal ring 21. This annular retaining flange 33, as illustrated by FIGS. 6 and 7, is of a generally stepped configuration as it projects axially outwardly and includes an inner cylindrical wall 62 which projects axially outwardly for termination at a shoulder 63, the latter projecting radially outwardly for merger with a further inner cylindrical wall 64 which then projects axially so as to terminate at the free end of the retaining flange 33. This flange 33 has a plurality of generally circumferentially aligned and elongated grooves 65 which are undercut within the inner cylindrical wall 64, which grooves at one side thereof terminate substantially at the shoulder 63. The bottoms of these grooves 65 along opposite sides thereof are formed generally with undercuts 66. The grooves, in the circumferential direction, terminate at end walls 67 (FIG. 5) with the adjacent end walls 67 of adjacent grooves 65 being circumferentially spaced a small distance apart by an intermediate wall region 68 (FIG. 5) which is free of the undercut grooves. In the illustrated embodiment, the retainer flange 33 will be provided with a plurality, normally three to six, grooves 65 which cooperate so as to effectively define a surrounding undercut annular groove which is substantially continuous except for the nongrooved wall regions 68, there typically being three to six such regions, which are defined between the ends of each adjacent pairs of grooves 65. These wall regions 68 will normally be uniformly spaced apart circumferentially of the retaining flange 33.

One of the elongate resilient centering strips 61 is confined within each of the grooves 65. This centering strip 61 is formed from a generally rectangular piece of thin platelike spring steel and has a plurality of openings or windows 71 formed therethrough in longitudinally-spaced relationship therealong. These windows 71 result in the centering strip 61 having continuous edge strips 72 which extend along opposite edges of the resilient strip, and these edge strips in turn are integrally joined together by a plurality of transverse strips 73. Strips 61 are manufactured in a transversely curved condition, where the transverse strips 73 have a resilient bowed configuration when captivated within the groove 65, whereby the opposite side edges of the strip project into the undercuts 66 and the transverse strips 73 project resiliently toward the open mouth of the groove so as to project radially inwardly for resilient supporting contact with an outer cylindrical surface 74 as defined on the seal ring 21.

As illustrated by FIG. 7, the seal ring 21 has an annular rib portion 75 which is formed integrally with the seal ring 21 in exterior surrounding relationship therewith, with this annular rib part 75 projecting outwardly beyond the cylindrical exterior surface 76. Annular rib part 75 is provided with an axial length, as defined between the axial end faces 77, which is significantly less than the overall axial length of the face ring 21, and in fact the axial length of rib 75 as measured between the faces 77 will typically be somewhat less than one-half the axial dimension of the face ring 21 as measured between the front and rear faces 23 and 35 thereof. This annular rib 75 is normally disposed so that it is substantially centrally positioned between the front and rear faces 23 and 35.

When the resilient centering strips 61 resiliently supportingly contact the exterior cylindrical surface 74, which contact in effect constitutes an elongate annular strip which extends around the rib 75 over a significant majority of the circumferential extent thereof, this contact results in imposition of a radially inwardly directed support force which is not only uniformly distributed circumferentially around the seal ring 21, but is also directed radially inwardly in close proximity to the centroid of the face ring 21 so as to prevent or at least greatly minimize distortion thereof.

Figure 3:
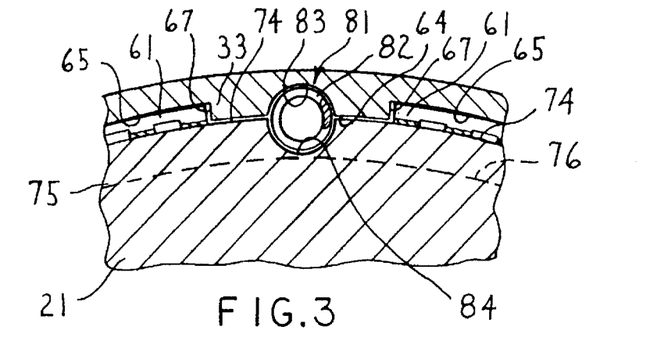
FIGS. 3 and 4 are fragmentary sectional views taken respectively along lines 3—3 and 4—4 in FIG. 2.

To nonrotatably and hence drivingly connect seal ring 21 to the shaft support sleeve 31, each of the nongrooved wall regions 68, as defined circumferentially between the adjacent ends of each pair of resilient centering strips 61, has a resilient pinless drive connection 81 (FIGS. 1–5) associated therewith. This pinless drive connection 81 includes a generally cylindrical coil spring member 82 which is oriented with its axis extending generally parallel with the axial direction of the seal assembly. This coil spring member 82 is disposed within and confined by radially opposed grooves 83 and 84 which are respectively formed in the retaining flange 33 and the annular seal ring rib 75. These grooves 83 and 84 are each generally of semicircular cross section and are of a diameter which exceeds the exterior diameter of the coil spring member 82 so as to permit this coil spring member 82 to be positioned within and confined by the opposed grooves 83 and 84, which grooves cooperate to define a confinement region for the spring member, as illustrated by FIG. 3. The groove 84 extends axially through the entire width of the annular seal ring rib 75. The opposed groove 83 is undercut in and extends axially of the inner cylindrical surface 64, as illustrated by FIG. 3, with this groove being generally centered between the end walls 67 of the circumferentially adjacent grooves 65, and hence centered between the ends of adjacent centering strips 61. This groove 83, however, projects axially inwardly to and beyond the shoulder 63, and in fact projects inwardly through an axial distance slightly beyond the rear face 35 of the seal ring 21. This extension of the groove 83 beyond the shoulder 63 results in formation of a substantially cylindrical confinement bore or groove 85 (FIG. 4) which extends through an angle significantly in excess of 180° and in fact through an angle which more closely approaches 360°, whereby this bore 85 provides for controlled confinement of the axially rearward portion of the coil spring member 82 which projects therein.

Figure 4:
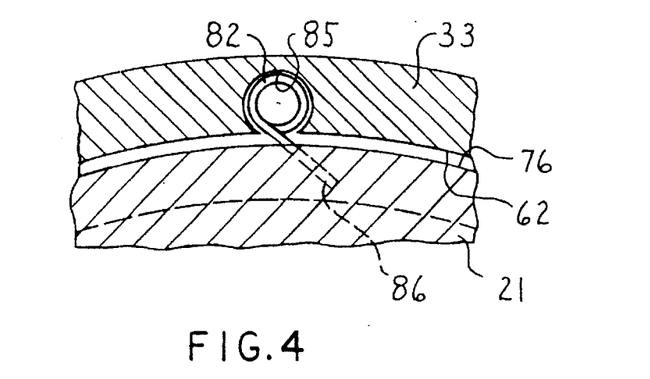

The coil spring member 82 is normally and preferably provided with the individual coils maintained in close association with one another, such as substantially in contact with one another, thereby providing a large number of individual coils which each individually provide opportunity for contact with the walls defining the grooves 83 and 84. The coil spring member 82 also preferably has an overall axial length which is significantly greater than the diameter of the spring member, and in the illustrated embodiment approximately one-half of the spring length is confined between the opposed grooves 83 and 84, each of which effectively confine and contact the opposite cylindrical halves of the coil spring. The remainder of the axial length of the coil spring member 82, which remainder is also about one-half of the overall length in the illustrated embodiment, is disposed within and closely confined by the bore 85.

The rearward free end of the coil spring member 82 is provided with an outwardly projecting tang 86, the latter being defined as an integral outward extension of the wire rod which defines the coil spring member. This tang 86 projects radially inwardly so as to overlap the rear face 35 of the rotatable seal ring 21. The backing flange 32 is provided with a shallow annular recess 87 therein so as to accommodate the tang 86, whereby the tang 86 is captivated between the backing ring and the seal ring, and the tang in turn axially retains the coil spring member 82 within the bore 85.

The function and operation of the mechanical seal according to the present invention, and specifically the improved function associated with the resilient pinless drive connection 81, will now be briefly described.

The seal assembly 11 operates in a generally conventional manner in that rotation of the shaft 13 causes a corresponding rotation of the shaft sleeve 31 and of the seal ring 21 carried thereby due to the connection therebetween by the resilient pinless drive connectors 81. These resilient pinless drive connectors 81 prevent relative rotation between the shaft sleeve 31 and the seal ring 21, and in fact cause synchronous rotation of the seal ring 21 due to the driving thereof by the shaft sleeve 31. Throughout either rotatable or nonrotatable conditions, the seal ring 21 is maintained in a generally concentric or centered position relative to the shaft sleeve due to the resilient support thereof by the plurality of encircling resilient centering strips 61, which resilient centering strips maintain a floatable resilient support of the seal ring 21.

During rotation of the seal ring 21, the pressurized fluid, normally a gas, present within the high pressure chamber 18 gains access into the grooves 25 formed on one of the seal faces and creates a thin film of pressurized gas between the seal faces 23 and 24 so as to maintain a narrow gap therebetween, such being conventional and well known in dry gas seals. The escape of gas from between the seal faces is severely limited or controlled by the annular dam which is defined between the opposed seal faces 23 and 24 adjacent the radially inner ends of the grooves 25.

With respect to the cooperation which exists at the resilient pinless drive connector 81, the rearward half (rightward half in FIGS. 1 and 2) of the coil spring member 82 is substantially axially and circumferentially confined within the bore 85 formed in the retaining flange 33, and hence this positionally maintains the coil spring member in fixed relation relative to the shaft sleeve member. The forward half (that is, the leftward half in FIGS. 1 and 2) of the coil spring member 82, however, is cantilevered outwardly from the bore 85 so that substantially one diametrical half of the forward spring portion is confined within the groove 83 formed in the retaining flange 33, and the other diametral half of the front portion of the coil spring member 82 is confined within the groove 84 formed in the annular seal ring rib 75. Since these two grooves 83 and 84 substantially entirely enclose and closely confine the front half of the coil spring member 82, the driving rotation of the shaft sleeve member 31 carries with it the retaining flange 33 and in turn causes rotation of the coil spring member 82. The cooperation and close confinement of the front half of the coil spring member 82 within the groove 83 causes driving rotation of the front portion of the coil spring member 82, which portion reacts through the close confinement of the groove 84 with the seal ring 21 so as to effect synchronous driven rotation thereof.

Since the actual rotational drive-transmitting member between the driving flange 33 and the driven seal ring 21 is defined by the coil spring member 82, this results in a plurality of drive points being created at each drive location since the inherent limited resiliency and deformability of the coil spring member 82 enables the adjacent coils of each spring to themselves adjust at least a limited extent with respect to one another so that the coil spring member has multiple drive-transmitting contact points with the side walls of the grooves 83 and 84. This thus minimizes the stress at each individual contact point, namely at each coil contact point, particularly where the individual coils contact the wall of the groove 84 formed in the brittle seal ring 21. Thus, with respect to an individual or single resilient pinless drive connector 81, the driving coil spring member 82, considered by itself, provides for significant reduction with respect to stress at any contact point due to the multiple driving or contact points created by the engagement of the coil member 82 with the groove wall 84 defined on the seal ring 21.

The overall stress imposed on the seal ring 21 at any drive contact point is still further reduced by the fact that a plurality of pinless drive connectors 81 are provided circumferentially, with the seal assembly preferably employing three to six such drive connectors 81 in uniformly circumferentially-spaced relation. While normal tolerances would prevent a plurality of rigid pins from being effective in transmitting drive from the retaining flange to the seal ring, nevertheless the provision of the multiple coil spring members 82 as driving members is highly effective in providing for significant driving torque being transmitted through each of the coil spring members 82. The inherent elasticity of each coil spring member 82 is such as to automatically correct for circumferential position inaccuracies (such as due to manufacturing tolerances) of the plurality of drive connectors 81 with respect to one another and with respect to the overall seal assembly, whereby all of the coil spring members 82 will thus be effective in transmitting at least a reasonable share of the driving torque from the driving flange 33 to the seal ring 21. This more uniform sharing of the driving torque as transferred throughout the plurality of drive connectors 81, coupled with the multiple drive points created at each individual driving coil spring 82, results in the contact stress as imposed on the brittle seal ring 21 at any one point being extremely small, particularly in comparison to conventional rigid pin drives, whereby chipping and breakage of the brittle seal ring 21 can be greatly minimized.

While the invention as illustrated in the drawings and as described above relates to a driving coil spring 82 sized so that approximately one-half of the length thereof is in driving engagement with the brittle rotating seal ring 21, it will nevertheless be appreciated that this merely illustrates a preferred embodiment of the invention, and that the positional relationships of the coil spring 82 relative to the supporting flange 33 and the driven seal ring 21 can be varied significantly from the relationships disclosed herein without departing from the teachings and features of the resilient pinless drive connector of the present invention.

In addition, while the resilient pinless drive connector 81 of the invention is disclosed herein for use in association with a dry gas seal, and while use of this resilient pinless drive connector 81 is particularly desirable for use in a dry gas seal, it will nevertheless be understood that this resilient pinless drive connector is also equally applicable to other mechanical seals, particularly those which employ a brittle rotating seal ring, such-as a seal ring constructed of silicon carbide.

Figure 8:
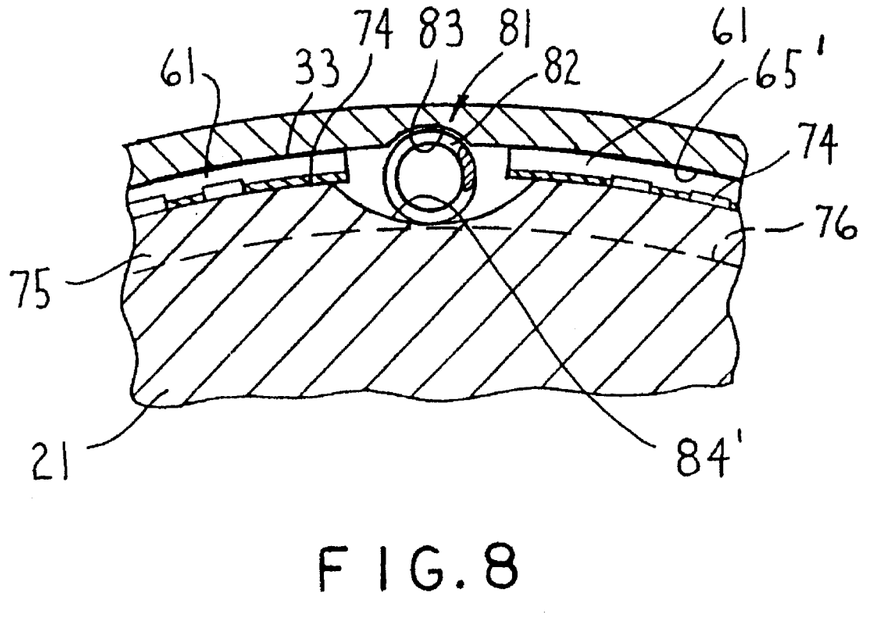
FIG. 8 is a fragmentary sectional view similar to FIG. 3 but illustrating some variations of the invention.

Referencing now FIG. 8, there is illustrated a sectional view similar to FIG. 3 but wherein some variations according to the present invention are illustrated. In this variation, the undercut grooves which retain the centering strips 61 are formed as a continuous annular groove 65' which extends across the spring retaining groove 83. By forming the groove 65' as a continuous surrounding annular groove, this greatly facilitates the convenience of manufacturing the retaining grooves. At the same time, since the retaining groove 65' is of significantly shallower depth than the spring retaining groove 83, the spring confinement function of the groove 83 is still retained. Further, in this variation, the centering strips 61 will normally be disposed so that the free ends thereof will be positioned closely adjacent opposite sides of the coil spring member 82.

Further, in the seal arrangement of the present invention, the groove formed in the seal ring 21 for accommodating the coil spring member 82, which groove is designated 84' in FIG. 8, can be circumferentially elongated, such as by being generated or formed on a larger radius. This circumferential elongation of the groove 84' ensures that the coil spring 82 will contact the wall of the groove 84' closer to the bottom of the groove, rather than permitting possible contact at the upper rim such as is possible with the arrangement shown in FIG. 3. This thus ensures that the contact and stress points between the coil spring 82 and the seal ring 21 occur at a region which is remote from a sharp corner or the like, and will result in less stress multiplication due to the decreased notch effect. Further, this circumferentially widened groove 84 also makes the overall drive arrangement more circumferentially tolerant and accommodating of misalignment.

Although a particular preferred embodiment of the invention has been disclosed in detail for illustrative purposes, it will be recognized that variations or modifications of the disclosed apparatus, including the rearrangement of parts, lie within the scope of the present invention.

The cross-sectional done-tailed configuration of the groove 65 is disclosed in detail in my copending application Ser. No. 08/202689, the disclosure of which is incorporated herein by reference.

The embodiments of the invention in which an exclusive property or privilege is claimed are defined as follows:

1. In a mechanical seal assembly for creating a sealing relationship between a housing and a shaft rotatable relative thereto, said seal assembly including first and second coaxially aligned seal rings disposed in axially adjacent and surrounding relationship to the shaft, said first and second seal rings having opposed flat seal faces thereon which are normally maintained in directly opposed and close association with one another to define an annular sealing region therebetween to effectively separate high and low pressure zones which are defined at opposite radial edges of said annular sealing region, said first seal ring being nonrotatably coupled to the housing, said second seal ring being nonrotatably coupled by a resilient drive connector to a drive member which is nonrotatably coupled to the shaft for rotation therewith, the improvement wherein said resilient drive connector comprises first and second axially-elongate grooves formed respectively in said drive member and said second seal ring, said first and second grooves being disposed closely adjacent and opening radially in opposed relation to one another, and an axially-elongate coil spring member disposed within and confined between said first and second grooves for transmitting rotational driving force from said drive member through said coil spring member to said second seal ring in response to rotation of said shaft.

2. A seal assembly according to claim 1, wherein each of said first and second grooves is approximately of arcuate cross section so that the first and second grooves cooperate to define an opening which confines the coil spring member therein.

3. A seal assembly according to claim 2, wherein the drive member includes an axially-elongate opening which approximates a cylindrical bore and which is coaxially aligned with and constitutes an extension of said first groove, said coil spring member including a first axially-elongate portion which is confined between said first and second grooves and a second axially-elongate portion which is confined within said opening.

4. A seal assembly according to claim 3, wherein said coil spring member has a tab part which projects radially outwardly from one end thereof and projects radially between opposed surfaces on said drive member and said second seal ring so as to axially position the coil spring member relative to the drive member and the second seal ring.

5. A seal assembly according to claim 3, wherein said drive member includes an annular axially-extending retaining flange which projects axially over at least a part of said second seal ring so as to exteriorly surround said second seal ring, said first groove being formed in said retaining flange and opening radially inwardly, said second groove being formed adjacent the exterior periphery of said second seal ring and opening radially outwardly in opposed relationship to said first groove.

6. A seal assembly according to claim 1, wherein a plurality of said resilient drive connectors are drivingly coupled between said drive member and said second seal ring in circumferentially-spaced relationship around said shaft.

7. A seal assembly according to claim 1, wherein said second seal ring is constructed of brittle material.

8. A seal assembly according to claim 1, wherein said drive member includes an annular axially-extending retaining flange which projects axially over at least a part of said second seal ring so as to exteriorly surround said second seal ring, said first groove being formed in said retaining flange and opening radially inwardly, said second groove being formed adjacent the exterior periphery of said second seal ring and opening radially outwardly in opposed relationship to said first groove.

9. A seal assembly according to claim 8, wherein said second seal ring is constructed of brittle material.

10. A seal assembly according to claim 9, wherein a plurality of circumferentially-elongate resilient centering strips are mounted on said retaining flange in generally surrounding relationship therewith, said resilient centering strips extending circumferentially of said retaining flange between circumferentially adjacent resilient drive connectors, said resilient retaining strips projecting generally radially inwardly and being disposed in resilient supporting engagement with an exterior annular surface defined on said second seal ring for resiliently supporting said second seal ring and maintaining said second seal ring centered relative to said shaft.

11. A seal assembly according to claim 10, wherein each resilient strip is elongated circumferentially of the retaining flange and has opposite circumferentially extending elongate edges thereof confined within undercut grooves formed in the retaining flange so that the strip is retained within said undercut grooves during assembly and disassembly with said second seal ring.

12. In a mechanical seal assembly for creating a sealing relationship between a housing and a shaft which is rotatable relative thereto, said seal assembly including first and second coaxially aligned and axially adjacent seal rings disposed in encircling relationship to the shaft and having axially adjacent and opposed flat seal faces for creating an annular sealing region therebetween, said first and second seal rings being respectively nonrotatably coupled to the housing and the shaft, a driving member being nonrotatably secured to the shaft and positioned in close proximity to the second seal ring, and a plurality of resilient drive connectors cooperating between the drive member and the second seal ring in angularly spaced relation therearound for effecting synchronous driving rotation of the second seal ring in response to rotation of the shaft, comprising the improvement wherein each said resilient drive connector includes a coil spring having multiple coils disposed in closely and axially adjacent relationship, first and second concave walls formed respectively on said drive member and said second seal ring, said coil spring being disposed within and at least partially confined by each of said first and second concave walls so that each of said first and second concave walls engages at least several coils of said coil spring for transmitting rotatable driving force from said drive member through said coil spring to said second seal ring.

13. A seal assembly according to claim 12, wherein each of said first and second concave walls is defined by an elongate groove having a partial circular cross section.

14. A seal assembly according to claim 12, wherein said coil spring includes a first axially-elongate portion which is disposed within and confined between said first and second concave grooves, and wherein said coil spring includes a second axially-elongate portion which is coaxially aligned and joined with said first portion, said second axially-elongate portion being confined within a surrounding wall which is defined on said drive member and surrounds said second axially-elongate portion around at least a majority of the exterior periphery thereof for confining the coil spring member on the drive member.

15. A seal assembly according to claim 12, which includes a plurality of circumferentially-elongate resilient centering means for centering said second ring relative to said shaft which are circumferentially mounted in cooperating engagement with said drive member and said second seal ring between circumferentially adjacent resilient drive connectors.

16. In a mechanical seal assembly for creating a sealing relationship between a housing and a shaft rotatable relative thereto, said seal assembly including first and second coaxially aligned seal rings disposed in axially adjacent and surrounding relationship to the shaft, said first and second seal rings having opposed flat seal faces thereon which are normally maintained in directly opposed and close association with one another to define an annular sealing region therebetween to effectively separate high and low pressure zones which are defined at opposite radial edges of said annular sealing region, said first seal ring being nonrotatably coupled to the housing, said second seal ring being of a brittle carbide material and being nonrotatably coupled by a resilient drive connector to a drive member which is nonrotatably coupled to the shaft for rotation therewith, the improvement wherein said resilient drive connector comprises first and second axially-elongate grooves formed respectively in said drive member and said second seal ring, said first and second grooves being of partial circular cross section and opening radially in opposed relation to one another, and an axially-elongate cylindrical elastic member disposed within and confined between said first and second grooves, said grooves cooperating to define an opening which closely confines the cylindrical elastic member to cause rotation of said second seal ring in response to rotation of said shaft.

17. A seal assembly according to claim 15, wherein said drive member includes an axially-elongate bore which is coaxially aligned with and constitutes an extension of said first groove, said elastic member including a first axially-elongate portion which is confined between said first and second grooves and a second axially-elongate portion which is confined within said bore.

18. A seal assembly according to claim 15, wherein said elastic member has a tab part that projects radially outwardly from one end thereof which said end is disposed within said bore, said tab part extending radially from said bore and projecting between opposed surfaces on said drive member and said second seal ring so as to axially position said elastic member relative to said drive member and said second seal ring.

19. A seal assembly according to claim 15, wherein a plurality of said resilient drive connectors are drivingly coupled between said drive member and said second seal ring in a circumferentially-spaced relationship relative to said second seal ring, a plurality of circumferentially-elongate resilient centering means for centering said second ring relative to said shaft being circumferentially mounted in cooperating engagement with said drive member and said second seal ring, each said resilient centering means being disposed between circumferentially adjacent resilient drive connectors.

20. A seal assembly according to claim 19, wherein each said resilient centering means is a circumferentially-elongate resilient centering strip mounted on said drive member and projecting generally radially inwardly toward said second seal ring in resilient supporting engagement with an exterior annular surface defined on said second seal ring.

* * * * *